United States Patent
Tippana

(10) Patent No.: US 10,560,662 B1
(45) Date of Patent: Feb. 11, 2020

(54) ESTABLISHING INSTANT MEETING FOR ACTIVE DISCUSSION THREADS

(71) Applicant: Microsoft Technology Licensing, LLC, Redmond, WA (US)

(72) Inventor: Sreevani Tippana, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/183,366

(22) Filed: Nov. 7, 2018

(51) Int. Cl.
 *H04N 7/15* (2006.01)
 *H04L 29/06* (2006.01)
 *H04L 12/58* (2006.01)

(52) U.S. Cl.
 CPC .............. *H04N 7/15* (2013.01); *H04L 51/046* (2013.01); *H04L 51/16* (2013.01); *H04L 65/1069* (2013.01)

(58) Field of Classification Search
 CPC ..... H04N 7/15; H04L 51/046; H04L 65/1069; H04L 51/16
 See application file for complete search history.

(56) References Cited

U.S. PATENT DOCUMENTS

| | | | |
|---|---|---|---|
| 8,887,070 B1 | 11/2014 | Hecht et al. | |
| 9,514,435 B2 | 12/2016 | Nguyen | |
| 2011/0289142 A1 | 11/2011 | Whalin et al. | |
| 2011/0289433 A1 | 11/2011 | Whalin et al. | |
| 2013/0139213 A1* | 5/2013 | El Houmaidi | ........ G06F 21/552 726/1 |
| 2013/0262594 A1* | 10/2013 | Bastide | .................. H04L 67/22 709/206 |
| 2014/0025734 A1 | 1/2014 | Griffin | |
| 2015/0172227 A1* | 6/2015 | Grove, II | ................ H04L 51/32 709/206 |
| 2015/0193441 A1* | 7/2015 | Jamrog | ............. G06F 16/24578 707/748 |
| 2015/0356127 A1* | 12/2015 | Pierre | ................. G06F 16/2228 707/706 |
| 2015/0356571 A1* | 12/2015 | Chang | ................ G06Q 30/0201 705/7.29 |
| 2016/0191446 A1 | 6/2016 | Grol-prokopczyk et al. | |
| 2017/0083628 A1* | 3/2017 | Frenkel | .................. G06Q 50/01 |
| 2017/0353510 A1* | 12/2017 | Levine | .................. H04L 65/403 |

(Continued)

OTHER PUBLICATIONS

"Application as Filed in U.S. Appl. No." 16/057,229, filed Aug. 7, 2018, 60 Pages.

*Primary Examiner* — Stella L. Woo
(74) *Attorney, Agent, or Firm* — Schwegman Lundberg & Woessner, P.A.

(57) ABSTRACT

An instant meeting in the form of a video and/or audio call is initiated when a discussion thread becomes sufficiently active. Information about a discussion thread of two or more participants is stored and a number of messages related to the discussion thread from the two or more participants in a predetermined period of time is determined. When the number of messages related to the discussion thread within the predetermined period of time from the two or more participants exceeds a first threshold, a mean time between replies to messages in the discussion thread is calculated. The meeting or call for the two or more participants is established when the number of messages exceeds the first threshold and the mean time between replies to messages in the discussion thread is below the second threshold.

14 Claims, 6 Drawing Sheets

(56) References Cited

U.S. PATENT DOCUMENTS

2018/0227273 A1     8/2018  Shumsker et al.
2018/0270277 A1*    9/2018  Blanchard ............ H04L 65/1069
2019/0019155 A1*    1/2019  Arora ................... G06Q 10/107

* cited by examiner

| N=9, MEAN-TIME-BETWEEN-REPLIES = 2 MIN | | | |
|---|---|---|---|
| N=1 | MEAN-TIME-BETWEEN-REPLIES=0 | T=2MIN | |
| N=2 | MEAN-TIME-BETWEEN-REPLIES=1 | T=3MIN | |
| N=3 | MEAN-TIME-BETWEEN-REPLIES=1 | T=4MIN | |
| N=4 | MEAN-TIME-BETWEEN-REPLIES=1 | T=5MIN | |
| N=5 | MEAN-TIME-BETWEEN-REPLIES=1 | T=6MIN | CASE - 1 |
| N=6 | MEAN-TIME-BETWEEN-REPLIES=1 | T=7MIN | |
| N=7 | MEAN-TIME-BETWEEN-REPLIES=1 | T=8MIN | |
| N=8 | MEAN-TIME-BETWEEN-REPLIES=1 | T=9MIN | |
| N=9 | MEAN-TIME-BETWEEN-REPLIES=1 | T=10MIN | |
| SHOW "JUMP ON A CALL" | | | |

*FIG. 1A*

| N=1 | MEAN-TIME-BETWEEN-REPLIES=1 | T=2MIN | |
|---|---|---|---|
| N=2 | MEAN-TIME-BETWEEN-REPLIES=1 | T=3MIN | CASE - 2 |
| N=2 | MEAN-TIME-BETWEEN-REPLIES=1 | T=4MIN | |

*FIG. 1B*

| N=1 | MEAN-TIME-BETWEEN-REPLIES=2 | T=2MIN | |
|---|---|---|---|
| N=2 | MEAN-TIME-BETWEEN-REPLIES=1 | T=3MIN | |
| N=1 | MEAN-TIME-BETWEEN-REPLIES=37 | T=40MIN | |
| N=2 | MEAN-TIME-BETWEEN-REPLIES=1 | T=41MIN | |
| N=3 | MEAN-TIME-BETWEEN-REPLIES=1 | T=43MIN | |
| N=4 | MEAN-TIME-BETWEEN-REPLIES=1 | T=44MIN | CASE - 3 |
| N=5 | MEAN-TIME-BETWEEN-REPLIES=1 | T=45MIN | |
| N=6 | MEAN-TIME-BETWEEN-REPLIES=1 | T=46MIN | |
| N=7 | MEAN-TIME-BETWEEN-REPLIES=1 | T=47MIN | |
| N=8 | MEAN-TIME-BETWEEN-REPLIES=1 | T=48MIN | |
| N=9 | MEAN-TIME-BETWEEN-REPLIES=1 | T=49MIN | |
| SHOW "JUMP ON A CALL" | | | |

*FIG. 1C*

SREEVANI TIPPANA - OCTOBER 11 AT 11:40 AM - EDITED
DA
202 — #TESTING

👍 LIKE   ↩ REPLY   ⦗ SHARE   ✎ EDIT   ○○○

204 — # JOIN A CALL? CALL CURRENTLY IN PROGRESS WITH SREEVANI TIPPANA, MICHAEL DUNNAM AND 6 OTHERS

ADD TOPICS

▢ SHOW 21 PREVIOUS REPLIES

SREEVANI TIPPANA - OCTOBER 12 AT 2:14 PM
POSTING

👍 LIKE   ↩ REPLY   ⦗ SHARE   ✎ EDIT   ○○○

SREEVANI TIPPANA - OCTOBER 12 AT 2:14 PM
POSTING

👍 LIKE   ↩ REPLY   ⦗ SHARE   ✎ EDIT   ○○○

⎫
⎬ 200
⎭

206 — # JOIN A CALL? CALL CURRENTLY IN PROGRESS WITH SREEVANI TIPPANA, MICHAEL DUNNAM AND 6 OTHERS

ADD TOPICS

TEST

200 {
  SHOW 21 PREVIOUS REPLIES

SREEVANI TIPPANA · OCTOBER 12 AT 2:14 PM
  POSTING
  👍 LIKE  ↩ REPLY  ⌔ SHARE  ✎ EDIT  ○○○
}

*FIG. 2B*

ESTABLISHING INSTANT MEETING FOR ACTIVE DISCUSSION THREADS

BACKGROUND

Currently, when multiple people discuss hot topics and/or debatable topics in discussion threads in email applications (e.g., Outlook), social media applications (e.g. Twitter™, Yammer™, Facebook™, etc.), on collaboration platforms (e.g., Slack™), and other forms of asynchronous communications where messages are posted and replies are not expected immediately, messages in the discussion thread may start posting rapidly. When messages are posting rapidly, the delay in typing messages often makes it difficult for discussion participants to stay current with the discussion and to convey their ideas quickly enough to be considered in the discussion thread. It is desired to automatically recognize when a discussion thread becomes active and to initiate an instant meeting in the form of an audio and/or video conference call among the participants in the discussion thread so that no comments are lost.

SUMMARY

Various details for the embodiments of the inventive subject matter are provided in the accompanying drawings and in the detailed description text below. It will be understood that the following section provides summarized examples of some of these embodiments.

The systems and methods described herein detect when a discussion thread becomes active and prompts the participants in the discussion thread to join an instant meeting in the form of an audio/video call. The systems and methods described herein monitor the activity on a discussion thread and, when the discussion thread becomes sufficiently active, suggests to participants in the discussion thread to "Meet now," "Join a call," or the like. By initiating an instant meeting or call when the discussion thread is most active, the system saves the time of the participants in the discussion thread and enables rapid decision making and conclusions when the participants would otherwise be replying to messages/posts within short periods of time. Also, by initiating a call when a discussion thread is most active, computer processing resources for managing the discussion thread are saved as the computer automatically synchs the discussion participants into an instant meeting and ends the discussion thread, thereby freeing the computer resources for other discussion threads.

In sample embodiments, participants in a discussion thread are invited to a voice and/or video conference or a meeting is suggested to the participants when a predetermined number of posts related to a particular topic in the discussion thread are made in a predetermined period of time. The system automatically identifies a trending topic from a discussion feed and automatically establishes a voice and/or video conference for at least the active members of the discussion thread. In doing so, the system provides participants in a discussion thread with a platform that enables greater and faster expression of their ideas and more productive discussions as and when needed.

In sample embodiments, the above-mentioned and other features are provided by a computer-implemented method of initiating an instant meeting in the form of an audio and/or video conference call. The method includes storing information about a discussion thread of two or more participants. The number of messages related to the discussion thread from the two or more participants in a predetermined period of time is determined, and based on determining that the number of messages related to the discussion thread within the predetermined period of time from the two or more participants exceeds a first threshold, establishes a meeting or call for the two or more participants.

In particular implementations of the sample embodiments, the information about the discussion thread comprises a thread ID, message content, and a time between replies to messages in the discussion thread. Determining the number of messages related to the discussion thread from the two or more participants in a predetermined period of time may further comprise counting a number of messages related to the discussion thread and, when the number of messages exceeds the first threshold, calculating a mean time between replies to messages in the discussion thread. Such determinations may further comprise determining whether the mean time between consecutive replies for each message in the discussion thread is below a second threshold, wherein the meeting or call for the two or more participants is established when the number of messages exceeds the first threshold and the mean time between replies to messages in the discussion thread is below the second threshold.

In other implementations of the sample embodiments, machine learning tools are used to evaluate message content in the discussion thread to identify messages related to a common topic. Then, a meeting or call is established for the two or more participants when the number of messages related to the common topic within the predetermined period of time from the two or more participants exceeds the first threshold. Establishing a meeting or call for the two or more participants may further comprise sending a meeting invitation to the two or more participants involved in the discussion thread. A title of the meeting invitation is also determined by performing natural language processing of the text of the number of messages in the discussion thread and correlating text in the discussion thread with products, keywords, and/or individuals associated with the products and keywords referenced in the discussion thread.

As discussed herein, the logic, commands, or instructions that implement aspects of the methods described above may be provided in a computing system including any number of form factors for the computing system such as desktop or notebook personal computers, mobile devices such as tablets, netbooks, and smartphones, client terminals and server-hosted machine instances, and the like. Another embodiment discussed herein includes the incorporation of the techniques discussed herein into other forms, including into other forms of programmed logic, computer-readable media, hardware configurations, or specialized components or modules, including an apparatus with respective means to perform the functions of such techniques. The respective algorithms used to implement the functions of such techniques may include a sequence of some or all of the electronic operations described above, or other aspects depicted in the accompanying drawings and detailed description below. Such systems and computer-readable media including instructions for implementing the methods described herein also constitute sample embodiments.

This summary section is provided to introduce aspects of the inventive subject matter in a simplified form, with further explanation of the inventive subject matter following in the text of the detailed description. This summary section is not intended to identify essential or required features of the claimed subject matter, and the particular combination and order of elements listed this summary section is not intended to provide limitation to the elements of the claimed subject matter.

BRIEF DESCRIPTION OF THE DRAWINGS

In the drawings, which are not necessarily drawn to scale, like numerals may describe similar components in different views. The drawings illustrate generally, by way of example, but not by way of limitation, various embodiments discussed in the present document.

FIG. 1A illustrates an example of a discussion thread determined to be sufficiently active to initiate an instant meeting or call.

FIG. 1B illustrates an example of a discussion thread determined to be insufficiently active to initiate an instant meeting or call.

FIG. 1C illustrates an example of a discussion thread determined to be sufficiently active to initiate an instant meeting or call starting after the third reply.

FIG. 2B illustrates a sample screenshot of how the option to join a call is presented at the beginning of the thread starter, or at the end of the discussion thread, before the participant in the discussion thread composes new replies to the discussion thread.

DETAILED DESCRIPTION

Figure 2A:
FIG. 2A illustrates a sample screenshot of how the option to join a call is presented to participants in a discussion thread.

The following description with respect to FIGS. 1-5 sufficiently illustrates specific embodiments to enable those skilled in the art to practice them. Other embodiments may incorporate structural, logical, process, and other changes. Portions and features of some embodiments may be included in, or substituted for, those of other embodiments. Embodiments set forth in the claims encompass all available equivalents of those claims.

The systems and methods described herein recognize that when participants converse on using asynchronous communications platforms like Microsoft® Teams™ and Yammer™, they sometimes get excited/bothered by the topic of a discussion thread and rapidly start posting replies to the discussion thread. For example, suppose that there has been an on-call incident, and participants upon discovering the discussion thread started posting replies to the discussion thread very rapidly as and when they discover the discussion thread. The discussion thread may receive replies, messages, and updates very quickly with potentially several new messages posted every minute. As another example, assume that there was another discussion thread where someone had asked a question in the thread-starter and participants started answering the question but generally disagreed with one of the answers. In such a case, the conversation may get active whereby with each new message on the discussion thread, for or against the answer, the replies to the discussion thread may arrive rapidly one after the other and, in any case, too close together for all messages to be read before the participant may type out a response. In such cases, typing a new message and/or new content for the discussion thread may seem to be futile. Such cases may lead participants to abandon the discussion thread and to wish to initiate a video and/or audio call to end the rapid-fire asymmetrical communications.

To address such scenarios, the systems and methods described herein provide a platform for monitoring the creation of new discussion threads. For every new discussion thread, the rate at which new replies/messages are posted to the discussion thread is monitored. The rate at which replies/messages are posted to the discussion thread is compared to a previously defined threshold that has been set to establish when a discussion thread has become active or "hot" and initiation of a video and/or audio call may be desirable. For example, if posts/replies are received at the rate of 10 replies/minute for at least 3 minutes, this might indicate that this discussion thread's topic is of interest and has become "hot." As soon as this discussion thread has been detected in the backend communication services to be active, the backend communication services may automatically initiate an audio and/or video call and invite all or only the most active (or most recently active) participants in the discussion thread. For example, on a Microsoft® personal assistant platform such as Cortana™, the Cortana™ integrations may pop up a button to participants in the discussion thread that says "Meet now." The participants in the discussion thread may select the button that says "Meet now" and become participants in the meeting. Alternatively, the invited participants may simply click on a link and be taken to collaboration software such as Microsoft® Teams™ for a discussion. Those users who want to have a face-to-face discussion are thus enabled to have a faster and more productive discussion.

In addition, the "hot" discussion thread can be ranked higher in the discovery feeds of those who work with (immediate team or larger organizations) the participants in the "hot" discussion thread. This enables those additional participants to participate in the "hot" discussion thread and to possibly be invited to the meeting/call as well. Such features help to position asynchronous communication tools such as those used with Yammer™ available from Microsoft® as comprehensive tools for communication that is not time-sensitive.

In sample embodiments, the rate of incoming messages/replies assigned to a particular discussion thread is monitored and the discussion thread's topic hotness is inferred from the rate such messages/replies are assigned to the particular discussion thread. This rate information is used to suggest that the participants on the particular discussion thread continue the conversation using a synchronous medium of communication such as an audio/video call on a communications platform such as Teams™, Hipchat™, Slack™, etc.

In sample embodiments, topic/message "hotness" is determined by defining two variables by which the "hotness" of a discussion thread may be defined. "Mean-time-between-replies" measures the time in-between replies to a message that are posted and stored for every message in a discussion thread. "N" is the number of consecutive replies for a discussion thread. In sample embodiments, "N" and "mean-time-between-replies" have predetermined values that, when exceeded, trigger the suggestion to show "jump on a call." The values for "N" and "mean-time-between-replies" are configurable based on various factors such as the popularity of the group/topic/distribution list in which the discussion thread is posted, the average number of messages in a specific discussion thread, and the like.

FIGS. 1A, 1B, and IC illustrate examples for determining whether a discussion thread is sufficiently active to initiate a call.

In the example shown in FIG. 1A, a discussion thread is determined to be active or "hot" when there are N=9 replies and each of these replies satisfy the "mean-time-between-replies" requirement of 2 minutes or less. In case 1 shown in FIG. 1A, 9 replies 102 are received over the course of 10 minutes, so after the 9th message, a suggestion 104 to "Jump on a call" is automatically generated.

In the example shown in FIG. 1B, a discussion thread is still determined to be active when there are N=9 replies and each of these replies satisfy the "mean-time-between-replies" requirement of 2 minutes or less. However, in case 2 shown in FIG. 1B, since there are only 3 replies 106 in the discussion thread, no call is initiated, and the discussion thread is discarded.

In the example shown in FIG. 1C, a discussion thread is still determined to be active when there are N=9 replies and each of these replies satisfy the "mean-time-between-replies" requirement of 2 minutes or less. In case 3 shown in FIG. 1C, after the third reply 108, the discussion thread 110 becomes "hot," so a suggestion 112 to "Jump on a call" is automatically generated after the $9^{th}$ message 114 is received in the 10-minute time period. The first two messages 116 are ignored due to the long delay between the second and third messages, which does not satisfy the "mean-time-between-replies" requirement of 2 minutes or less. Thus, the 9-message threshold is applied like a moving window over the messages 116 and 110 to determine if any 9 messages have a mean-time-between-replies that is below the set threshold.

The decision to show a 'join call' button could be based on a combination of other inputs, besides using the time-between-replies and number of incoming messages on that thread. For example, the decision to show a 'join call' button could also be made if a person in the company 'X' replies twice or thrice on the thread. In such case, the threshold number of replies can be lowered to 7 instead of 10, and the suggestion to 'join call' can be shown.

In the above cases, the participants in the active trending discussion are invited to "Jump on a call." The call can be declined dismissed as unnecessary by participants as they deem fit. If a pattern is observed for declining/dismissing the call, the pattern could be input as a feedback to the system, that will take this into account when the system next prompts the participants to jump on a call. If a discussion participant declines to accept the invitation to join the call, the system may generate an inquiry asking the discussion participant the reason for not joining the call. Such information gathering is optional but may be useful to enable the system to learn why discussion participants choose to decline the invitations.

On the other hand, when the participants in the active trending discussion accept the suggestion to "Jump on a call." then the system automatically creates an "ad-hoc" meeting invitation that is sent to the discussion participants involved in the message/thread. The title of the meeting can be inferred from the topic of the thread-starter using natural language processing and machine learning models to extract the title. It is noted that the natural language processing and machine learning models need not be used to establish when to initiate the meeting/call but simply to establish the topic for the meeting/call and possibly who to invite based on the natural language processing of the text of the discussion thread. Also, the meeting/call is not initiated based on the overall duration of the discussion thread or because certain keywords show up frequently in the discussion thread. Rather, the meeting/call is initiated if the level of activity on the topic as determined by the techniques described herein suggests that a meeting would be appropriate.

The suggestion to show a "Jump on a call" could also be based on a combination of factors such as discussion thread activity level, the number of message participants, the time spent exchanging messages on the topic of the discussion, content/keywords specific to a product and/or a hashtag, and the like. In such situations, the call provides an opportunity for all participants in the discussion thread or others associated with the trending topic to be invited to join the call. The meeting could be provided, for example, to invite decision-makers to the discussion and to provide context for the decisions. Dialog may be generated to determine whether others should be invited to the call. The system would automatically add the others to the list of participants to be invited to the call. Others to be invited to the call may also be automatically determined from natural language processing of the dialog of the discussion thread and using machine learning models to invite persons identified in the text, the persons associated with a mentioned product, and the like.

The meeting would be set to start immediately, after a short time delay, or at a time determined upon automatic reconciliation of the calendars of the discussion participants. The meeting could be set in time blocks of 0.25 hour, 0.5 hour, 1 hour time slots, etc.

It will be appreciated that no moderator for the call is required as the call is set up automatically when the activity level threshold has been exceeded. Everyone on the discussion thread, or only the most active or most recent participants in the discussion thread, are invited to join the call. Of course, a moderator may be included as an option. The moderator could be an administrator of the discussion thread or group in which the thread was created. The moderator would be established beforehand. Alternatively, the moderator could be the person who started the discussion thread, the person who is the most active participant in the discussion thread, and the like.

FIGS. 2A and 2B illustrate sample screenshots of invitations to discussion participants to join a call. FIG. 2A shows how the option to join a call could be presented for a discussion thread 200 having the topic 202 (e.g., #testing). As illustrated, the discussion participants are notified at 204 that a call is in progress. FIG. 2B illustrates how the option to join the call could be presented as a link 206 at the beginning of the thread starter, or at the end of the discussion thread, before the participant in the discussion thread composes new replies to the discussion thread. The link 206, when selected, will take the discussion thread participant to a conferencing device or module (either integrated with the asynchronous communication software or available from a 3rd party) that is configured to make multi-party calls.

Besides the invitation that goes to the participants in the thread, the invitation could also be a link to Skype meeting published near the thread. Anyone who is not participating in the thread, but sees this link can join too, if he has the permissions to access the threaded discussion. As another example, in Yammer, if it is a public group, then anyone who navigates to this group feed and sees this indication of a call going on in the thread can join the meeting and listen in, much like the way people can drop by and listen to and join in a hallway conversation in an office. On the other hand, in Yammer, if it is a private group, then only members in the group can see this link and join the conversation if they wish to.

System Configuration

Figure 3:
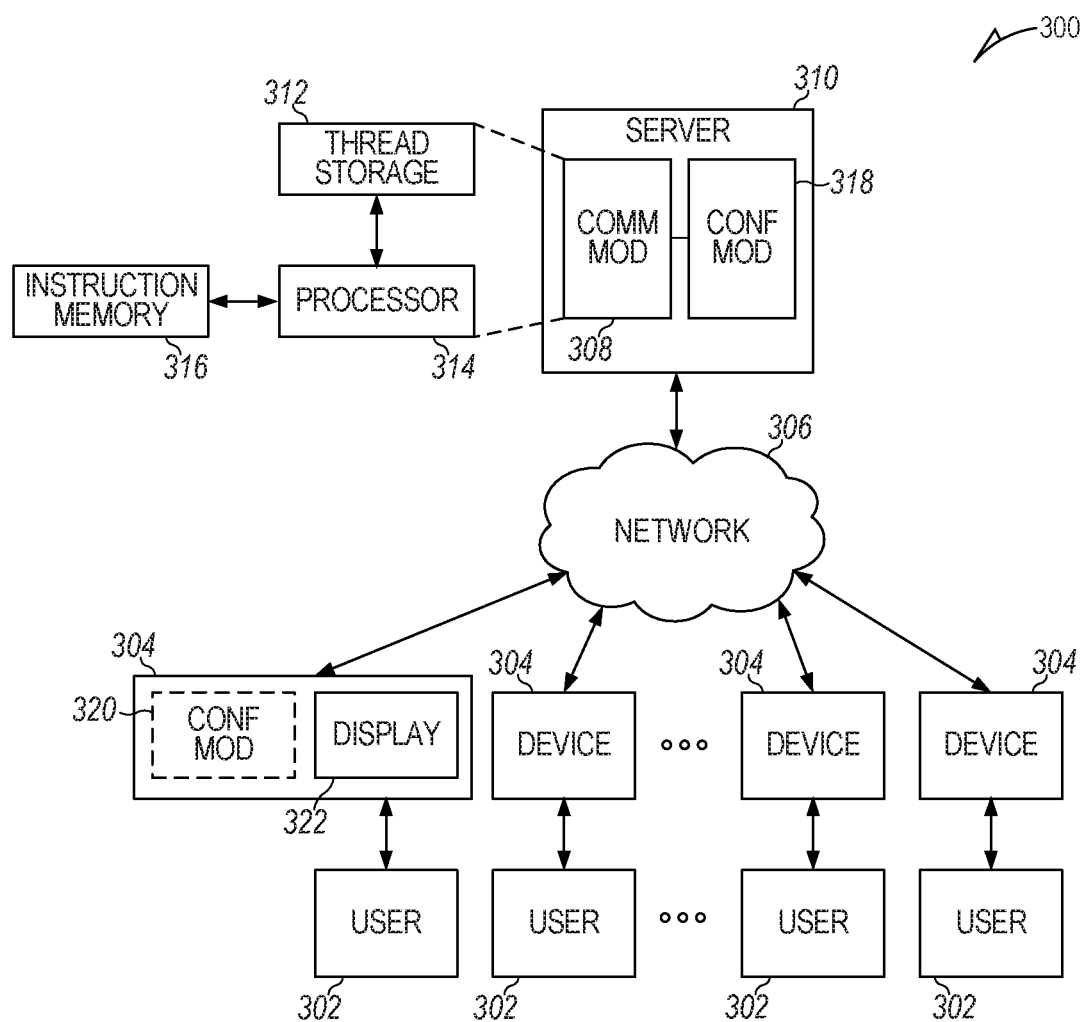
FIG. 3 illustrates a block diagram of an asynchronous communication system adapted to initiate an instant meeting in the form of an audio and/or video call in a sample embodiment.

FIG. 3 illustrates a block diagram of an asynchronous communication system 300 adapted to initiate an instant meeting in the form of an audio and/or video call in a sample embodiment. It will be appreciated by those skilled in the art that the audio and/or video call may be a phone call, a VOIP Skype call, online conference call, and any other audio and/or video communications platform. As illustrated, discussion participants 302 are actively participating in a discussion thread provided to their respective computing devices 304 (e.g., smartphones, handhelds, laptop computers, etc.) via network 306. In sample embodiments, the discussion thread is generated by an asynchronous communication device such as an asynchronous communication module 308 provided in a server 310. The asynchronous communication module 308 may comprise an email application (e.g., Outlook), a social media application (e.g. Twitter™, Yammer™, Facebook™, etc.), a collaboration platform (e.g., Slack™), a platform where users post questions to get answers (e.g., StackOverflow), or any other hardware and/or software platform for asynchronous communications where messages are posted and replies are not expected immediately. The asynchronous communication device may also be a hardware device separate from server 310. In sample embodiments, the asynchronous communication module 308 is modified to include a discussion thread storage device 312 that initiates storage of a discussion thread by assigning a thread ID upon receipt of a thread starter. Responses to the thread starter are stored in the discussion thread storage device 312 under the same thread ID. The discussion thread storage 312 stores the message content as well as the "mean-time-between-replies" number of consecutive replies "N" for a discussion thread as described above with respect to FIGS. 1A, 1B, and 1C. Processor 314 calculates the mean-time-between-replies to update the discussion thread storage 312 as appropriate. Processor 314 performs such calculations as instructed by software instructions retrieved from instruction memory 316.

As explained below with respect to FIG. 4, the instructions provided to processor 314 by instruction memory 316 include computations of whether the discussion thread for a particular thread ID has become "hot" and, as appropriate, instructions for initiating or suggesting an instant meeting in the form of an audio and/or video call by contacting conferencing device such as conferencing module 318 with a listing of the potential participants in such a call. The instructions 316 may also include instructions for performing natural language processing of the respective discussion threads to identify the discussion thread topic and/or potential participants in the instant meeting by correlating text in the discussion thread with products and keywords and/or individuals associated with the products and keywords referenced in the discussion threads. Alternatively, a default text, such as "Adhoc meeting for this thread," can be used to initiate an instant meeting or call.

FIG. 3 also illustrates a user device 304 as containing a conferencing device such as a conferencing module 320 for initiating audio and/or video calls and a display 322 for interacting with the discussion thread. Those skilled in the art will appreciate that a browser of the user's computing device 304 may be modified to track the number of messages sent/received on a particular discussion thread and for detecting the activity level of the discussion thread using the techniques described herein. However, in sample embodiments, the system for tracking the number of messages sent/received on a particular discussion thread and for detecting "the level of activity of the discussion thread is provided on the server 310 of the communication software platform as described above. As an example, a backend server of the Yammer™ messaging platform available from Microsoft® could be used as the asynchronous communication device 308 and such device could be modified to include a system of the type described herein for tracking the number of messages sent/received on a particular discussion thread and for detecting the activity level of the discussion thread. Data store 312 of the messaging platform would store the thread starter message and assign it a thread ID. Subsequent messages sent/received in the discussion thread started by the thread starter would be assigned the same thread ID and stored in the data store 312. As indicated by way of example in FIGS. 1A, 1B, and 1C, in addition to the text of the discussion thread, the data store would include metadata associated with the thread ID identifying the message ID and number of responses in the discussion thread, the mean-time-between-replies, and the time duration of the discussion thread since inception. The metadata would thus include the information necessary to determine the time difference between replies in the discussion thread and the mean time difference between responses associated with a particular thread ID. Other fields present could be "created_at," "group_id," "time between replies=diff (Nth reply/message created_at −(N−1)th reply/message created_at), and group_id: group in which the message was posted. As messages are received or at designated intervals, the number of messages associated with a thread ID is checked and the mean-time-between replies is calculated by processor 314 to determine whether the number of messages needed to establish "hotness" has been exceeded and whether the mean-time-between-replies is below the set threshold for "hotness." If both conditions are satisfied, the system generates a message that is pushed out to the computing device 304 of each discussion participant or other party that is to participate in the instant meeting or audio/video call.

Figure 4:
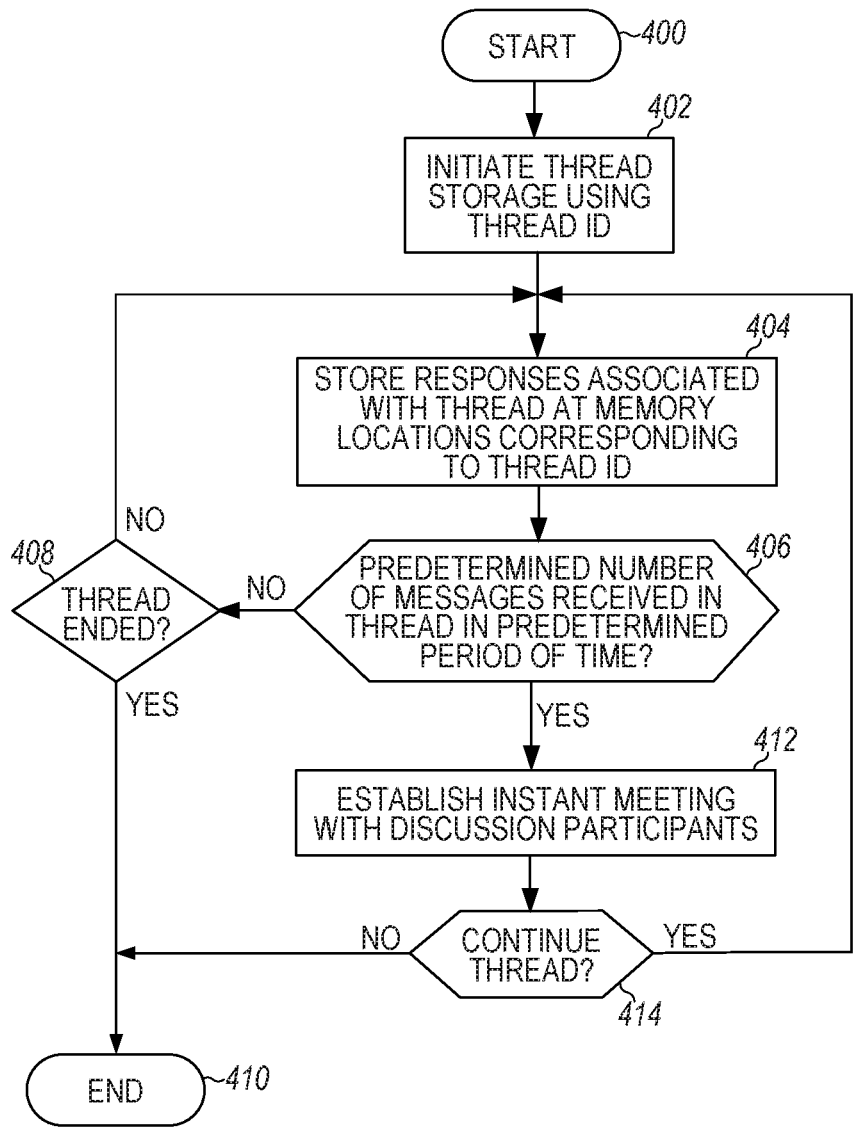
FIG. 4 illustrates a flow chart of a method for establishing an instant meeting or call for active discussion threads in a sample embodiment.

FIG. 4 illustrates a flow chart of a method implemented by processor 314 for establishing an instant meeting for active discussion threads in a sample embodiment. As illustrated, the process starts at 400 and the processor 314 reads instructions from instruction memory 316 that are processed to store information at 402 about a discussion thread of two or more participants in discussion thread storage 312 using an assigned thread ID. In sample embodiments, the information about the discussion thread includes the thread ID, message content, and a time between replies to messages in the discussion thread. Subsequent responses in that discussion thread are stored at memory locations corresponding to the thread ID at 404. As illustrated in FIGS. 1A, 1B, and 1C, the responses are processed to determine if a predetermined number of responses N for the response threshold have been received for the discussion thread at a rate above a rate threshold set by the mean-time-between-replies variable. In other words, the processor 314 checks at 406 to determine whether a predetermined number of messages related to the discussion thread from the two or more participants have been received in a predetermined period of time. In sample embodiments, determining the number of messages related to the discussion thread from the discussion participants includes counting a number of messages related to the discussion thread and, when the number N of messages exceeds a predetermined threshold, calculating the meantime-between-replies for the most recent N messages in the discussion thread. The processor 314 then determines whether the mean time between consecutive replies for the most recent N messages in the discussion thread is below a rate threshold.

When the number of messages related to the discussion thread within the predetermined period of time from the two or more participants does not exceed a threshold indicative that the discussion thread is sufficiently active or "hot" (i.e., not enough message are received and/or the messages are not received at a sufficiently rapid rate), the processor 314 checks at 408 if the discussion thread has ended due to inactivity for a period of time or has been expressly ended by an administrator or discussion thread participant. If the discussion thread has ended, the process ends at 410. Otherwise, the next response in the discussion thread for the given thread ID is stored at 404 and steps 406 and 408 are repeated.

When it is determined at step 406 that the number of messages related to the discussion thread within the predetermined period of time from the two or more participants does exceed the threshold indicative that the discussion thread is sufficiently active or "hot," the processor 314 instructs the conferencing module 318 to initiate an instant meeting in the form of an audio/video or phone conference for the discussion thread participants at 412 by sending a meeting invitation to the participants involved in the discussion thread. Upon establishing the instant meeting at 412, the discussion thread may either continue at 414 or be terminated at 410.

In sample embodiments, establishing the instant meeting at 412 may also include using machine learning to evaluate message content in the discussion thread to identify additional individuals besides the participants in the discussion thread who may be invited to the instant meeting. Establishing the instant meeting at 412 may also include automatically extracting the contact information for the respective discussion participants and automatically determining a title of the instant meeting invitation by performing natural language processing of the message content in the discussion thread to extract the title of the discussion thread and/or a title determined by performing a keyword evaluation of the discussion thread when a title has not been provided. As noted above, establishing the instant meeting may also include sending a "button" or a link to the discussion participants that may be selected to bring the respective participants into an audio and/or video multi-party conference space established by the conference modules 320 of the respective user computing devices 304. The audio and/or video call is established and broken down in the conventional fashion.

Figure 5:
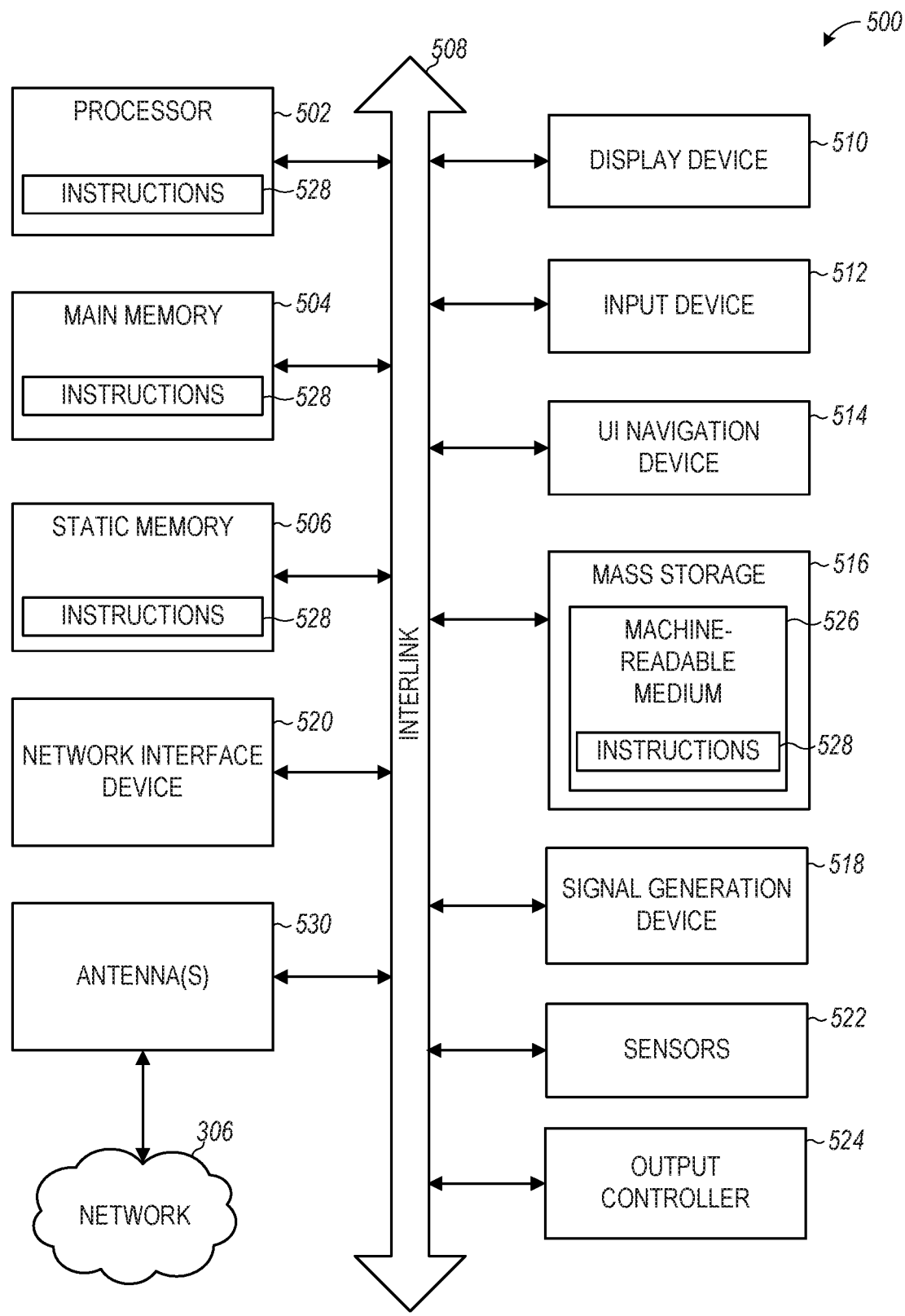
FIG. 5 is a block diagram illustrating an example of a machine upon which one or more embodiments may be implemented.

FIG. 5 illustrates a block diagram of an example machine 500 that may be used as server 310 for implementing the asynchronous communication module 308 including the system for initiating an instant meeting in the form of a video and/or audio call as described herein. In alternative embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environment. In sample embodiments, the machine 500 as well as the user devices 304 may be a personal computer (PC), a tablet PC, a set-top box (STB), a personal digital assistant (PDA), a mobile telephone, a smart phone, a web appliance, a server, a network router, switch or bridge, or any machine capable of executing instructions (sequential or otherwise) that specify actions to be taken by that machine. For example, machine 500 may serve as a workstation, a front-end server, or a back-end server of an asynchronous communication system as described herein. Machine 500 may implement the methods described herein by running the communication module 308 as well as the conferencing module 318 described with respect to FIG. 3 and FIG. 4. Further, while only a single machine 500 is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, processors, logic or a number of components, modules, or mechanisms (herein "modules"). Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible hardware and/or software entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 500 may include a hardware processor 502 (e.g., a central processing unit (CPU), a graphics processing unit (GPU), a hardware processor core, or any combination thereof), a main memory 504 and a static memory 506, some or all of which may communicate with each other via an interlink (e.g., bus) 508. The machine 500 may further include a display unit 510 (shown as a video display), an alphanumeric input device 512 (e.g., a keyboard), and a user interface (UI) navigation device 514 (e.g., a mouse). In an example, the display unit 510, input device 512 and UI navigation device 514 may be a touch screen display. The machine 500 may additionally include a mass storage device (e.g., drive unit) 516, a signal generation device 518 (e.g., a speaker), a network interface device 520, and one or more sensors 522. Example sensors 522 include one or more of a global positioning system (GPS) sensor, compass, accelerometer, temperature, light, camera, video camera, sensors of physical states or positions, pressure sensors, fingerprint sensors, retina scanners, or other sensors. The machine 500 may include an output controller 524, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The mass storage device 516 may include a machine readable medium 526 on which is stored one or more sets of data structures or instructions 528 (e.g., software) embodying or utilized by any one or more of the techniques or functions described herein. The instructions 528 may also reside, completely or at least partially, within the main memory 504, within static memory 506, or within the hardware processor 502 during execution thereof by the machine 500. In an example, one or any combination of the hardware processor 502, the main memory 504, the static memory 506, or the mass storage device 516 may constitute machine readable media.

While the machine readable medium 526 is illustrated as a single medium, the term "machine readable medium" may include a single medium or multiple media (e.g., a centralized or distributed database, and/or associated caches and servers) configured to store the one or more instructions 528.

The term "machine readable medium" may include any medium that is capable of storing, encoding, or carrying instructions for execution by the machine 500 and that cause the machine 500 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine-readable media. In some examples, machine readable media may include machine readable media that is not a transitory propagating signal.

The instructions 528 may further be transmitted or received over communications network 306 using a transmission medium via the network interface device 520. The machine 500 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 520 may include one or more physical jacks (e.g., Ethernet, coaxial, or phone jacks) or one or more antennas 530 to connect to the communications network 306. In an example, the network interface device 520 may include a plurality of antennas 530 to wirelessly communicate using at least one of single-input multiple-output (SIMO), multiple-input multiple-output (MIMO), or multiple-input single-output (MISO) techniques. In some examples, the network interface device 520 may wirelessly communicate using Multiple User MIMO techniques.

Other Notes and Examples

Example 1 is a computer-implemented method of initiating an instant meeting in the form of a video and/or audio call, the method comprising storing, using one or more processors, information about a discussion thread of two or more participants: determining, using the one or more processors, a number of messages related to the discussion thread from the two or more participants in a predetermined period of time; and when the one or more processors determines that the number of messages related to the discussion thread within the predetermined period of time from the two or more participants exceeds a first threshold, the one or more processors establishing a meeting or call for the two or more participants.

Example 2 is a method as in example 1, wherein the information about the discussion thread comprises a thread ID, message content, and a time between replies to messages in the discussion thread.

Example 3 is a method as in examples 1 or 2, wherein determining the number of messages related to the discussion thread from the two or more participants in a predetermined period of time comprises the one or more processors counting a number of messages related to the discussion thread and, when the number of messages exceeds the first threshold, calculating a mean time between replies to messages in the discussion thread.

Example 4 is a method as in any of examples 1 to 3, further comprising determining, using the one or more processors, whether the mean time between consecutive replies for each message in the discussion thread is below a second threshold, wherein the meeting or call for the two or more participants is established when the number of messages exceeds the first threshold and the mean time between replies to messages in the discussion thread is below the second threshold.

Example 5 is method as in any of examples 1 to 4, further comprising using machine learning to evaluate message content in the discussion thread to identify messages related to a common topic and the one or more processors establishing a meeting or call for the two or more participants when the number of messages related to the common topic within the predetermined period of time from the two or more participants exceeds the first threshold.

Example 6 is a method as in any of examples 1 to 5, wherein establishing a meeting or call for the two or more participants comprises sending a meeting invitation to the two or more participants involved in the discussion thread.

Example 7 is a method as in any of examples 1 to 6, further comprising determining a title of the meeting invitation by performing natural language processing of the text of the number of messages in the discussion thread and correlating text in the discussion thread with products, keywords, and/or individuals associated with the products and keywords referenced in the discussion thread.

Example 8 is an asynchronous communication system comprising an asynchronous communication device that establishes and maintains a discussion thread among two or more participants; a conferencing device that establishes and maintains a video and/or audio call for two or more participants; and a processor configured to process instructions to cause the conferencing device to initiate an instant meeting in the form of a video and/or audio call by performing the steps of: storing information from the asynchronous communication device about a discussion thread of the two or more participants; determining a number of messages related to the discussion thread from the two or more participants in a predetermined period of time: and when the number of messages related to the discussion thread within the predetermined period of time from the two or more participants exceeds a first threshold, instructing the conferencing device to establish a meeting or call for the two or more participants.

Example 9 is system as in example 8, wherein the information about the discussion thread comprises a thread ID, message content, and a time between replies to messages in the discussion thread.

Example 10 is a system as in examples 8 or 9, wherein the processor is configured to count a number of messages related to the discussion thread and, when the number of messages exceeds the first threshold, the processor is caused to calculate a mean time between replies to messages in the discussion thread.

Example 11 is a system as in any of examples 8 to 10, wherein the processor is further configured to determine whether the mean time between consecutive replies for each message in the discussion thread is below a second threshold, wherein the processor is caused to instruct the conferencing device to establish a meeting or call for the two or more participants when the number of messages exceeds the first threshold and the mean time between replies to messages in the discussion thread is below the second threshold.

Example 12 is a system as in any of examples 8 to 11, wherein the processor is further configured to evaluate message content in the discussion thread using a machine learning model to identify messages related to a common topic and to instruct the conferencing device to establish a meeting or call for the two or more participants when the number of messages related to the common topic within the predetermined period of time from the two or more participants exceeds the first threshold.

Example 13 is a system as in any of examples 8 to 12, wherein the conferencing device establishes a meeting or call for the two or more participants by sending a meeting invitation to the two or more participants involved in the discussion thread.

Example 14 is a system as in any of examples 8 to 13, wherein the processor is configured to determine a title of the meeting invitation by performing natural language processing of the text of the number of messages in the discussion thread and to correlate text in the discussion thread with products, keywords, and/or individuals associated with the products and keywords referenced in the discussion thread.

Example 15 is a non-transitory computer readable storage medium having instructions stored thereon that when executed by one or more processors cause the one or more processors to implement a method of initiating an instant meeting in the form of at least one of a video and audio call, the method including storing information about a discussion thread of two or more participants; determining a number of messages related to the discussion thread from the two or more participants in a predetermined period of time; and when the one or more processors determines that the number of messages related to the discussion thread within the predetermined period of time from the two or more partici-pants exceeds a first threshold, the one or more processors establishing a meeting or call for the two or more participants.

Example 16 is a medium as in example 15, wherein the information about the discussion thread comprises a thread ID, message content, and a time between replies to messages in the discussion thread.

Example 17 is a medium as in examples 15 or 16, wherein the instructions include instructions to cause the one or more processors to count a number of messages related to the discussion thread and, when the number of messages exceeds the first threshold, to calculate a mean time between replies to messages in the discussion thread.

Example 18 is a medium as in any of examples 15 to 17, further comprising instructions to cause the one or more processors to determine whether the mean time between consecutive replies for each message in the discussion thread is below a second threshold, wherein the meeting or call for the two or more participants is established when the number of messages exceeds the first threshold and the mean time between replies to messages in the discussion thread is below the second threshold.

Example 19 is a medium as in any of examples 15 to 18, further comprising instructions to cause the one or more processors to evaluate message content in the discussion thread using machine learning to identify messages related to a common topic and to establish a meeting or call for the two or more participants when the number of messages related to the common topic within the predetermined period of time from the two or more participants exceeds the first threshold.

Example 20 is a medium as in any of examples 15 to 19, further comprising instructions to cause the one or more processors to determine a title of the meeting invitation by performing natural language processing of the text of the number of messages in the discussion thread and to correlate text in the discussion thread with products, keywords, and/or individuals associated with the products and keywords referenced in the discussion thread.

Alternative implementations of the asynchronous communication system described herein are contemplated. For example, the asynchronous communication system described herein may be implemented within or in association with an email application (e.g., Outlook), a social media application (e.g. Twitter™, Yammer™, Facebook™, etc.), a collaboration platform (e.g., Slack™), or any other platform for asynchronous communications where messages are posted and replies are not expected immediately. These and other implementations are included within the context of the disclosed embodiments as set forth in the following claims.

In the above Detailed Description, various features may be grouped together to streamline the disclosure. However, the claims may not set forth every feature disclosed herein as embodiments may feature a subset of the features. Further, embodiments may include fewer features than those disclosed in a particular example. Also, although the subject matter has been described in language specific to structural features and/or methodological acts with respect to a particular graphical user interface, it is to be understood that the subject matter defined in the appended claims is not necessarily limited to the specific embodiments, features, or acts described above. Rather, the specific embodiments, features, and acts described above are disclosed as example forms of implementing the claims. Thus, the following claims are hereby incorporated into the Detailed Description, with a claim standing on its own as a separate embodiment.

What is claimed is:

1. A computer-implemented method of initiating an instant meeting in the form of at least one of a video and audio call, the method comprising:
storing, using one or more processors, information about a discussion thread having two or more participants;
first determining, using the one or more processors, that a number of messages made in response to a thread starter of the discussion thread from the two or more participants exceeds a first threshold in a predetermined period of time;
in response to the first determining, second determining that a mean time between consecutive replies in the number of messages is below a second threshold; and
in response to the first and second determining, the one or more processors establishing a meeting or call for the two or more participants.

2. A method as in claim 1, wherein the information about the discussion thread comprises a thread ID, message content, and a time between replies to messages in the discussion thread.

3. A method as in claim 1, further comprising using machine learning to evaluate message content in the discussion thread to identify messages related to a common topic.

4. A method as in claim 1, wherein establishing the meeting or call for the two or more participants comprises sending a meeting invitation to the two or more participants involved in the discussion thread.

5. A method as in claim 4, further comprising determining a title of the meeting invitation by performing natural language processing of the text of the number of messages in the discussion thread and correlating text in the discussion thread with at least one of products, keywords, and individuals associated with the products and keywords referenced in the discussion thread.

6. An asynchronous communication system comprising:
an asynchronous communication device that establishes and maintains a discussion thread among two or more participants;
a conferencing device that establishes and maintains at least one of a video and audio call for two or more participants; and
a processor configured to process instructions to cause the conferencing device to initiate an instant meeting in the form of at least one of a video and audio call by performing the steps of:
storing information from the asynchronous communication device about a discussion thread of the two or more participants;
first determining that a number of messages made in response to a thread starter of the discussion thread from the two or more participants exceeds a first threshold in a predetermined period of time;
in response to the first determining, second determining that a mean time between consecutive replies in the number of messages is below a second threshold; and
in response to the first and second determining, instructing the conferencing device to establish a meeting or call for the two or more participants.

7. A system as in claim 6, wherein the information about the discussion thread comprises a thread ID, message content, and a time between replies to messages in the discussion thread.

8. A system as in claim 6, wherein the processor is further configured to evaluate message content in the discussion thread using a machine learning model to identify messages related to a common topic.

9. A system as in claim 6, wherein the conferencing device is configured to establish the a meeting or call for the two or more participants by sending a meeting invitation to the two or more participants involved in the discussion thread.

10. A system as in claim 9, wherein the processor is configured to determine a title of the meeting invitation by performing natural language processing of the text of the number of messages in the discussion thread and to correlate text in the discussion thread with at least one of products, keywords, and individuals associated with the products and keywords referenced in the discussion thread.

11. A non-transitory computer readable storage medium having instructions stored thereon that when executed by one or more processors cause the one or more processors to implement a method of initiating an instant meeting in the form of at least one of a video and audio call, the method including:
storing information about a discussion thread having two or more participants;
first determining that a number of messages made in response to a thread starter of the discussion thread from the two or more participants exceeds a first threshold in a predetermined period of time;
in response to the first determining, second determining that a mean time between consecutive replies in the number of messages is below a second threshold; and
in response to the first and second determining, the one or more processors establishing a meeting or call for the two or more participants.

12. A medium as in claim 11, wherein the information about the discussion thread comprises a thread ID, message content, and a time between replies to messages in the discussion thread.

13. A medium as in claim 11, further comprising instructions to cause the one or more processors to evaluate message content in the discussion thread using machine learning to identify messages related to a common topic.

14. A medium as in claim 13, further comprising instructions to cause the one or more processors to determine a title of a meeting invitation for the meeting by performing natural language processing of the text of the number of messages in the discussion thread and to correlate text in the discussion thread with at least one of products, keywords, and individuals associated with the products and keywords referenced in the discussion thread.

* * * * *